United States Patent
Yin et al.

(10) Patent No.: US 11,474,217 B2
(45) Date of Patent: Oct. 18, 2022

(54) TIME OF FLIGHT DEVICE AND TIME OF FLIGHT METHOD

(71) Applicant: Guangzhou Tyrafos Semiconductor Technologies Co., LTD, Guangzhou (CN)

(72) Inventors: Ping-Hung Yin, Taipei (TW); Jia-Shyang Wang, Miaoli County (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 318 days.

(21) Appl. No.: 16/898,396

(22) Filed: Jun. 10, 2020

(65) Prior Publication Data

US 2020/0400819 A1   Dec. 24, 2020

Related U.S. Application Data

(60) Provisional application No. 62/864,516, filed on Jun. 21, 2019.

(51) Int. Cl.

| | | |
|---|---|---|
| *G01S 7/4865* | (2020.01) | |
| *G01S 7/48* | (2006.01) | |
| *G01S 7/4861* | (2020.01) | |
| *G01S 7/484* | (2006.01) | |
| *G01S 17/10* | (2020.01) | |
| *G01S 7/481* | (2006.01) | |

(Continued)

(52) U.S. Cl.
CPC ............ *G01S 7/4865* (2013.01); *G01S 7/484* (2013.01); *G01S 7/4808* (2013.01);
(Continued)

(58) Field of Classification Search
CPC ........ G01S 17/10; G01S 17/14; G01S 17/894; G01S 7/4808; G01S 7/4816; G01S 7/484; G01S 7/4861; G01S 7/4863; G01S 7/4865
(Continued)

(56) References Cited

U.S. PATENT DOCUMENTS 6,452,666 B1 * 9/2002 Barna ..................... G01C 3/08
356/5.01
10,062,201 B2   8/2018 Nowozin et al.
(Continued)

FOREIGN PATENT DOCUMENTS

CN   105723238   3/2018
CN   109313264   2/2019
(Continued)

OTHER PUBLICATIONS

"Notice of Allowance of Taiwan Counterpart Application," dated Nov. 6, 2020, p. 1-p. 3.

*Primary Examiner* — Behrooz M Senfi
*Assistant Examiner* — Kathleen M Walsh
(74) *Attorney, Agent, or Firm* — JCIPRNET

(57) ABSTRACT

Time of flight device and method are provided. A light-emitting module emits a first light pulse to a sensing target, and a sensing unit receives and integrates a first reflected light pulse of the sensing target. A processing circuit reads an image parameter of the sensing target through a readout circuit. The light-emitting module emits a second light pulse to the sensing target, and the sensing unit receives a second reflected light pulse of the sensing target. The processing circuit obtains a distance parameter between the sensing target and the time of flight device according to a time when the readout circuit reads the second reflected light pulse of the sensing unit. The processing circuit obtains a reflectivity of the sensing target according to the image parameter and a look-up table, and obtains a corrected distance parameter of the sensing target by correcting the distance parameter according to the reflectivity.

18 Claims, 3 Drawing Sheets

(51) Int. Cl.
*G01S 7/4863* (2020.01)
*G01S 17/894* (2020.01)
(52) U.S. Cl.
CPC .......... *G01S 7/4816* (2013.01); *G01S 7/4861* (2013.01); *G01S 7/4863* (2013.01); *G01S 17/10* (2013.01); *G01S 17/894* (2020.01)
(58) Field of Classification Search
USPC ........................................................ 356/5.01
See application file for complete search history.

(56) References Cited

U.S. PATENT DOCUMENTS

| | | | | |
|---|---|---|---|---|
| 2006/0114333 A1* | 6/2006 | Gokturk | ............... | H04N 5/2355 |
| | | | | 348/222.1 |
| 2014/0263953 A1* | 9/2014 | Wang | ..................... | H04N 17/04 |
| | | | | 250/208.1 |
| 2017/0353707 A1* | 12/2017 | Wang | ....................... | G01S 17/42 |
| 2020/0033456 A1* | 1/2020 | Wang | ..................... | H04N 9/045 |
| 2020/0137373 A1* | 4/2020 | Iguchi | ....................... | G01C 3/06 |
| 2020/0217965 A1* | 7/2020 | Calder | ..................... | G01S 7/487 |
| 2020/0264287 A1* | 8/2020 | Graefling | ................ | G01S 7/497 |
| 2021/0018623 A1* | 1/2021 | Yang | ........................ | G01S 7/484 |

FOREIGN PATENT DOCUMENTS

| | | |
|---|---|---|
| EP | 3058389 | 11/2017 |
| TW | 201312144 | 3/2013 |
| TW | 201527784 | 7/2015 |
| TW | 201835603 | 10/2018 |

* cited by examiner

TIME OF FLIGHT DEVICE AND TIME OF FLIGHT METHOD

CROSS-REFERENCE TO RELATED APPLICATION

This application claims the priority benefit of U.S. provisional application No. 62/864,516, filed on Jun. 21, 2019. The entirety of the above-mentioned patent application is hereby incorporated by reference herein and made a part of this specification.

TECHNICAL FIELD

The invention relates to a sensing technology, and more particularly, to a time of flight device and a time of flight method.

BACKGROUND

In a readout circuit of a time of flight (ToF) circuit such as an analog-to-digital converter (ADC) circuit, a pulse signal provided by a pixel sensing a reflected light pulse is usually read by a comparator. In this regard, since a magnitude of an overdrive voltage between an inverting input terminal and a non-inverting input terminal of the comparator changes according to a pulse intensity of an input pulse signal, different comparator delays will be generated. Therefore, when the pulse signal provided by the pixel is input to the comparator, an output signal output by the comparator for calculating a time difference will have different degrees of delay according to the pulse intensity of the pulse signal. However, a reflectivity of an object surface affects a light intensity of the reflected light pulse, which in turn affects the pulse intensity of the pulse signal provided by the pixel. For example, if the pulse signal is stronger (the reflectivity is higher), the comparator delay will be shorter. Conversely, if the pulse signal is weaker (the reflectivity is lower), the comparator delay will be longer. In other words, since a distance measurement result of the time of flight circuit applied for short-distance can be easily affected by the reflectivity of the object surface of a sensing target to generate the different comparator delays, the distance measurement result may be inaccurate. Therefore, several solutions are provided in the following embodiments.

SUMMARY

The invention provides a time of flight device and a time of flight method that can provide an accurate time of flight function.

The time of flight device of the invention includes a processing circuit, a light-emitting module, a readout circuit and a sensing unit. The light-emitting module is coupled to the processing circuit. The readout circuit is coupled to the processing circuit. The sensing unit is coupled to the readout circuit. In a first sensing operation, the processing circuit drives the light-emitting module to emit a first light pulse to a sensing target, and the sensing unit receives and integrates a first reflected light pulse of the sensing target, so that the processing circuit reads an image parameter of the sensing target through a readout circuit. In a second sensing operation, the processing circuit drives the light-emitting module to emit a second light pulse to the sensing target, and the sensing unit receives a second reflected light pulse of the sensing target, so that the processing circuit obtains a distance parameter between the sensing target and the time of flight device according to a time at which the readout circuit reads the second reflected light pulse of the sensing unit. The processing circuit obtains a reflectivity of the sensing target according to the image parameter and a look-up table, and obtains a corrected distance parameter of the sensing target by correcting the distance parameter according to the reflectivity.

The time of flight method of the invention includes the following steps: in a first sensing operation, driving a light-emitting module to emit a first light pulse to a sensing target, and receiving and integrating a first reflected light pulse of the sensing target by a sensing unit, so as to read an image parameter of the sensing target through a readout circuit; in a second sensing operation, driving the light-emitting module to emit a second light pulse to the sensing target, receiving a second reflected light pulse of the sensing target by the sensing unit, so as to obtain a distance parameter between the sensing target and a time of flight device according to a time at which the readout circuit reads the second reflected light pulse of the sensing unit; obtaining a reflectivity parameter according to the image parameter and a look-up table; and obtaining a corrected distance parameter of the sensing target by correcting the distance parameter according to the reflectivity parameter.

Based on the above, the time of flight device and the time of flight method of the invention can correct the distance parameter of the sensing target sensed by a time of flight distance measurement by obtaining the reflectivity of the sensing target to effectively improve an accuracy of time of flight distance measurement.

To make the aforementioned more comprehensible, several embodiments accompanied with drawings are described in detail as follows.

DETAILED DESCRIPTION

Figure 1:
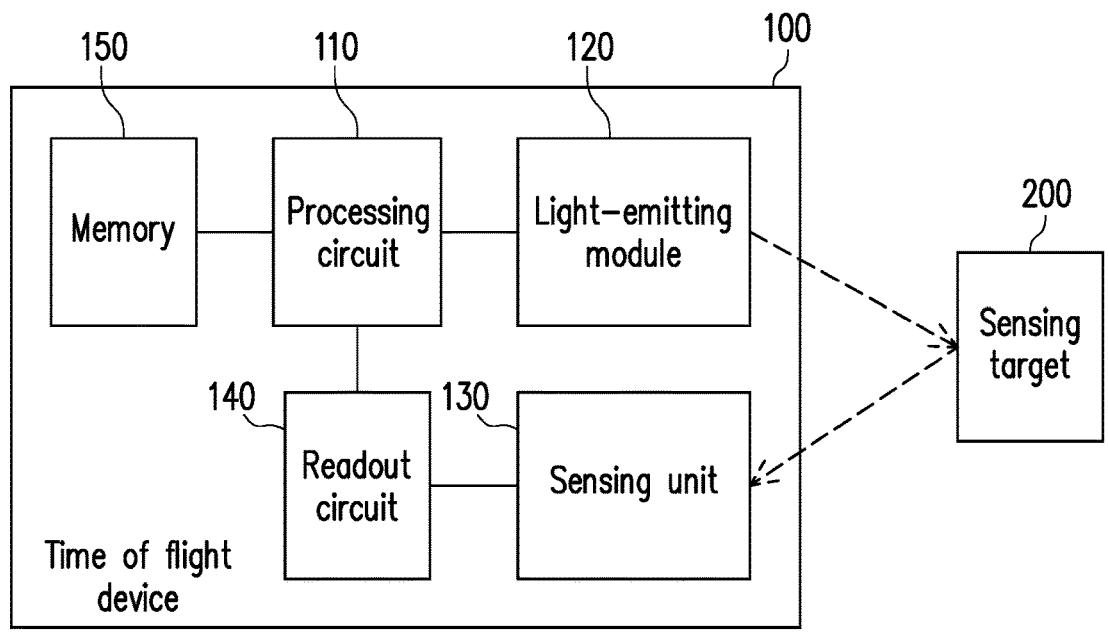
FIG. 1 is a block diagram of a time of flight device according to an embodiment of the invention.

In order to make content of the invention more comprehensible, embodiments are described below as the examples to prove that the invention can actually be realized. Moreover, elements/components/steps with same reference numerals represent same or similar parts in the drawings and embodiments.

FIG. 1 is a block diagram of a time of flight device according to an embodiment of the invention. Referring to FIG. 1, a time of flight device 100 includes a processing circuit 110, a light-emitting module 120, a sensing unit 130, a readout circuit 140 and a memory 150. The processing circuit 110 is coupled to the light-emitting module 120, the readout circuit 140 and the memory 150. The sensing unit 130 is coupled to the readout circuit 140. In this embodiment, the time of flight device 100 may emit a light pulse to a sensing target 200 through the light-emitting module 120, and may receive a reflected light pulse reflected by the sensing target 200 through the sensing unit 130. The processing circuit 110 of the time of flight device 100 may calculate a distance parameter between the sensing target 200 and the time of flight device 100 according to a time difference between the light pulse emitted by the light-emitting module 120 and the reflected light reflected by the sensing target 200 and received by the sensing unit 130. Further, the time of flight device 100 of the present embodiment may correct the distance parameter calculated above for a reflectivity of a surface of the sensing target 200 to provide an accurate distance measurement effect.

In this embodiment, the processing circuit 110 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar processing devices or a combination of these devices. The processing circuit 110 may be used to generate driving signals, perform a signal processing and execute related computing functions. In addition, the memory 150 can be used to pre-store a look-up table described in each embodiment of the invention, which may be read by the processing circuit 110 later.

In this embodiment, the light-emitting module 120 may include one or more laser light sources, and the one or more laser light sources may be, for example, pulse light emitters or laser diodes. The laser light source 120 may be used to emit a light pulse of infrared radiation (IR) to the sensing target 200, for example. In this embodiment, the sensing unit 130 may be, for example, a complementary metal-oxide-semiconductor image sensor (CMOS Image Sensor; CIS). In this embodiment, the sensing unit 130 may be, for example, a plurality of pixels arranged in an array or a plurality of pixel groups. The plurality of pixels may each include a photodiode for receiving or sensing the reflected light pulse of IR reflected by the sensing target 200.

Specifically, in a first sensing operation, the processing circuit 110 may drive the light-emitting module 120 to emit a first light pulse to the sensing target 200. The sensing unit 130 may receive and integrate a first reflected light pulse of the sensing target 200, so that the processing circuit 110 may read an image parameter of the sensing target 200 through the readout circuit 140. In a second sensing operation, the processing circuit 110 may drive the light-emitting module 120 to emit a second light pulse to the sensing target 200. It should be noted that, the first light pulse and the second light pulse may have the same pulse intensity. The sensing unit 130 receives a second reflected light pulse of the sensing target 200, so that the processing circuit 110 obtains the distance parameter between the sensing target 200 and the time of flight device 100 according to a time at which the readout circuit 140 reads the second reflected light pulse of the sensing unit 130. In this embodiment, the processing circuit 110 may obtain a reflectivity of the sensing target 200 by checking the look-up table according to the image parameter, and obtain a corrected distance parameter of the sensing target 200 by correcting the distance parameter according to the reflectivity.

It should be noted that, the image parameter refers to an image signal generated by the sensing unit 130 by receiving and integrating (exposing) the first reflected light pulse. An intensity of the image signal may be represented by a brightness value (or a pixel value or a gray scale value), for example. In other words, since a reflectivity of an object surface of the sensing target 200 affects the pulse intensity of the reflected light pulse reflected by the sensing target 200, the image parameter (the pixel value) of the present embodiment may correspond to the reflectivity of the object surface of the sensing target 200. In this regard, the memory 150 of the time of flight device 100 may store the look-up table in advance. A user may use incident light pulses with a specific pulse intensity to incident on known object surfaces with different reflectivities in advance and to establish the look-up table by sensing pulse intensities of reflected light pulses reflected by the object surfaces. In other words, the processing circuit 110 may read the look-up table pre-stored in the memory 150 to check the reflectivity of the corresponding object surface according to the known pulse intensity of the first light pulse and the image parameter. Then, the processing circuit 110 may calculate and correct an impact of the comparator delay caused by the reflectivity of the object surface in the distance parameter according to a magnitude of the reflectivity.

Figure 2:
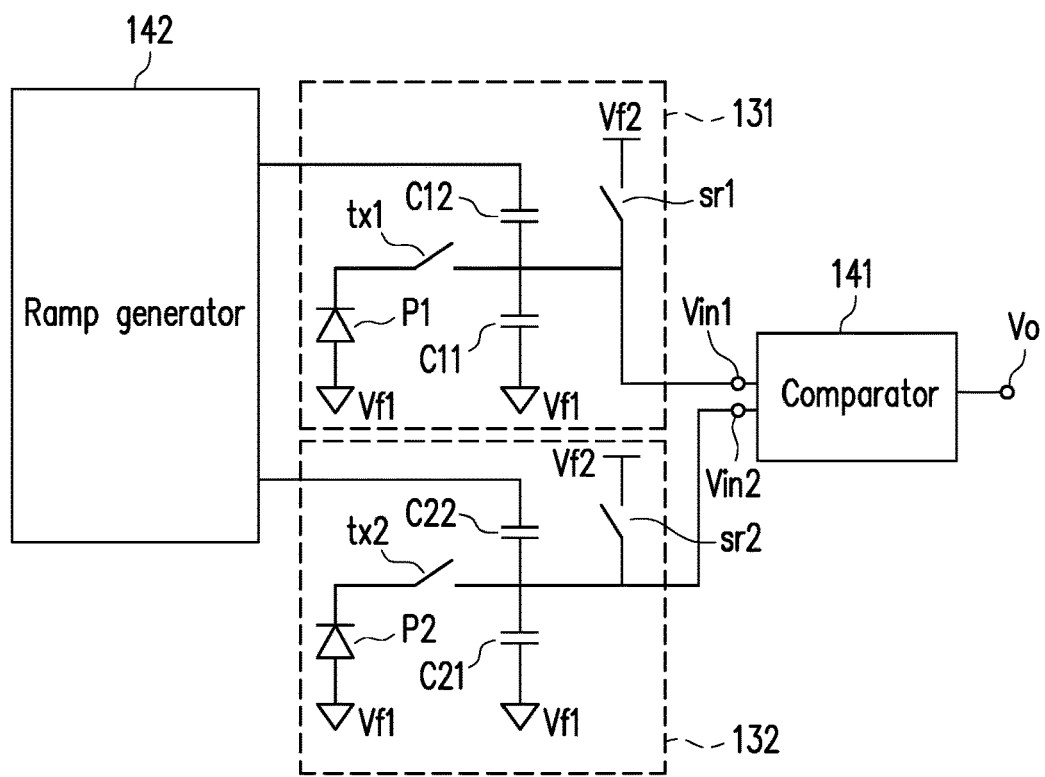
FIG. 2 is a circuit diagram of a sensing unit and a readout circuit according to an embodiment of the invention.

FIG. 2 is a circuit diagram of a sensing unit and a readout circuit according to an embodiment of the invention. Referring to FIG. 2, a pixel array of the sensing unit 130 of FIG. 1 may include a first pixel circuit 131 and a second pixel circuit 132 of FIG. 2, and the readout circuit 140 may include a comparator 141 and a ramp generator 142 of FIG. 2. In this embodiment, a first input terminal Vin1 of the comparator 141 is coupled to the first pixel circuit 131, and a second input terminal Vin2 of the comparator 141 is coupled to the second pixel circuit 132. The first pixel circuit 131 includes a photodiode P1, switches tx1 and sr1 and capacitors C11 and C12. A first terminal of the photodiode P1 is coupled to a first reference voltage Vf1, and a second terminal of the photodiode P1 is coupled to a first terminal of the switch tx1. A second terminal of the switch tx1 is coupled to the first terminal Vin1 of the comparator 141, a first terminal of the capacitor C11, a first terminal of the capacitor C12 and a first terminal of the switch sr1. A second terminal of the switch sr1 is coupled to a second reference voltage Vf2. A second terminal of the capacitor C11 coupled to the first reference voltage Vf1. A second terminal of the capacitor C12 is coupled to the ramp generator 142.

In this embodiment, the second pixel circuit 132 includes a photodiode P2, switches tx2 and sr2 and capacitors C21 and C22. A first terminal of the photodiode P2 is coupled to the first reference voltage Vf1, and a second terminal of the photodiode P2 is coupled to a first terminal of the switch tx2. A second terminal of the switch tx2 is coupled to the second terminal Vin2 of the comparator 141, a first terminal of the capacitor C21, a first terminal of the capacitor C22 and a first terminal of the switch sr2. A second terminal of the switch sr2 is coupled to the second reference voltage Vf2. A second terminal of the capacitor C21 coupled to the first reference voltage Vf1. A second terminal of the capacitor C22 is coupled to the ramp generator 142. An output terminal Vo of the comparator 141 may be coupled to the processing circuit 110 of FIG. 1.

Figure 3:
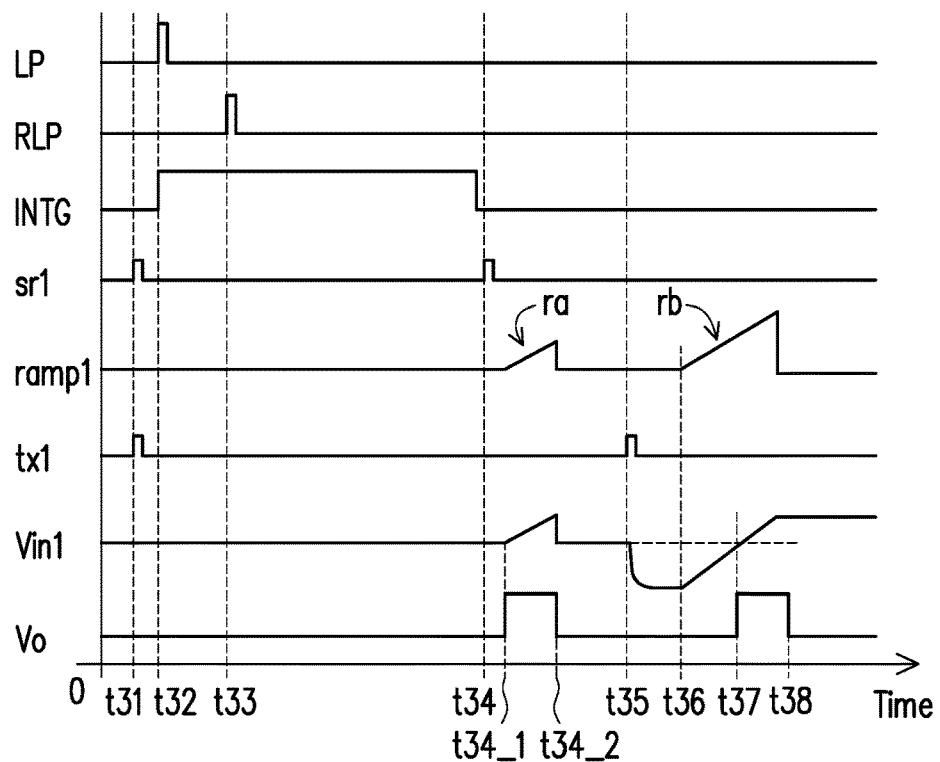
FIG. 3 is a signal and timing diagram of the first sensing operation according to the embodiment of FIG. 2 of the invention.

FIG. 3 is a signal and timing diagram of the first sensing operation according to the embodiment of FIG. 2 of the invention. Referring to FIG. 1 to FIG. 3, when the time of flight device 100 performs the first sensing operation, the processing circuit 110 drives the light-emitting module 120 to emit a first light pulse LP1 to the sensing target 200, and the first pixel circuit 131 is configured to receive and integrate a first reflected light pulse RLP1 of the sensing target 200 in the first sensing operation. In detail, the switch sr2 of the second pixel circuit 132 is turned on at a time t31

(and turned off after being briefly turned on), so that the second input terminal Vin2 of the comparator 141 may be maintained at the second reference voltage Vf2, but the invention is not limited thereto. At the time t31, the switches tx1 and sr1 are turned on (and turned off after being briefly turned on) to reset the photodiode P1. At a time t32, the light-emitting module 120 emits the first light pulse LP1, and the photodiode P1 starts an image integration period such as a timing INTG (from a time t32 to a time t34) to store charges in the capacitor C11. At the time t33, the photodiode P1 receives the first reflected light pulse RLP1.

At the time t34, the switch sr1 is turned on to reset the potential of the first input terminal Vin1 of the comparator 141 to the second reference voltage Vf2. Next, the ramp generator 142 provides a first ramp signal ramp1 having a first waveform ra to the first input terminal Vin1 of the comparator 141, so that the comparator 141 transitions at a time t34_1 to output a pixel reset value via the output terminal Vo. Then, the comparator 141 transition at a time t34_2 to return to the low level. At a time t35, the switch tx1 is turned on to release the charges stored by the capacitor C11 to the first input terminal Vin1 of the comparator 141, so that the voltage drops at the first input terminal Vin1 of the comparator 141. Next, at a time t36, the ramp generator 142 provides the first ramp signal ramp1 having a second waveform rb to the first input terminal Vin1 of the comparator 141, so that the voltage slowly rises at the first input terminal Vin1 and the comparator 141 transitions at a time 37 to output a pixel signal value via the output terminal Vo. Then, the comparator 141 transitions at a time t38 to return to the low level. In other words, when the time of flight device 100 performs the first sensing operation, the voltage slowly rises at the first input terminal Vn1 of the comparator 141 from the time t36 to the time t37 (as compared to receiving the pulse signal). Therefore, such comparator delay may be ignored or regarded as a constant value without affecting the pixel signal value output by the output terminal Vo of the comparator 141. More importantly, the processing circuit 110 may reduce noises based on a double delta sampling so as to read a real brightness value (real digital number (DN) value). In addition, for the overall pixel array, the pixel array of the sensing unit 130 may obtain a two-dimensional image in the first sensing operation.

Next, the processing circuit 110 may then check the look-up table stored in the memory 150 according to the brightness value to obtain the reflectivity of the object surface of the corresponding sensing target 200. However, the first sensing operation of the invention is not limited to the signals and the timing relationship of FIG. 3. In an embodiment, the first pixel circuit 131 and the second pixel circuit 132 may also input signals in from of differential signals to the first input terminal Vin1 and the second input terminal Vin2 of the comparator 141 to generate the real brightness value described above. Therefore, the ramp generator 142 may also provide a second ramp signal to the second input terminal Vin2 of the comparator 141, and the first ramp signal ramp1 and the second ramp signal are inverted.

Figure 4:
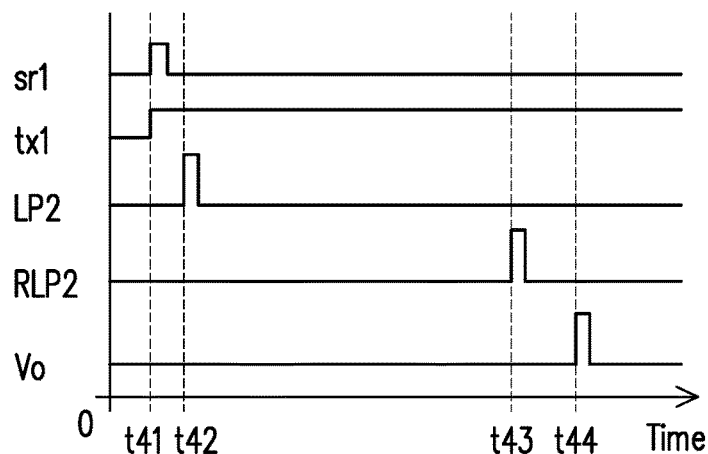
FIG. 4 is a signal and timing diagram of the second sensing operation according to the embodiment of FIG. 2 of the invention.

FIG. 4 is a signal and timing diagram of the second sensing operation according to the embodiment of FIG. 2 of the invention. Referring to FIG. 1 to FIG. 4, when the time of flight device 100 performs the second sensing operation, the processing circuit 110 drives the light-emitting module 120 to emit a second light pulse LP2 to the sensing target 200, and the first pixel circuit 131 is configured to receive and integrate a second reflected light pulse RLP2 of the sensing target 200 in the second sensing operation. It should be noted that, the first light pulse LP1 and the second light pulse LP2 may have the same pulse intensity. In detail, the switch sr2 of the second pixel circuit 132 is turned on at a time t41 (and turned off after being briefly turned on), so that the second input terminal Vin2 of the comparator 141 may be maintained at the second reference voltage Vf2, but the invention is not limited thereto. At the time t41, the switch and sr1 is turned on (and turned off after being briefly turned on), and the switch tx1 is continuously turned on. At a time t42, the light-emitting module 120 emits the second light pulse LP2, and the photodiode P1 starts sensing. At a time t43, the photodiode P1 receives the second reflected light pulse RLP2. Then, at a time t44, the comparator 141 outputs a pulse signal in response to the second reflected light pulse RLP2 to the processing circuit 110 via the output terminal Vo. It should be noted that, because the comparator 141 may be affected the comparator delay, the output terminal Vo of the comparator 141 cannot immediately output the pulse signal in response to the second reflected light pulse RLP2 at the time t43.

In this embodiment, the processing circuit 110 may calculate the distance parameter between the sensing target 200 and the time of flight device 100 according to a time difference between the second light pulse LP2 emitted by the light-emitting module 120 and the pulse signal in response to the second reflected light pulse RLP2 output by the output terminal Vo of the comparator 141. In other words, the processing circuit 110 may obtain the distance parameter by a direct time of flight (direct ToF; D-ToF). In addition, for the overall pixel array, the pixel array of the sensing unit 130 may obtain a depth image in the second sensing operation.

In this embodiment, the processing circuit 110 may check the look-up table stored in the memory 150 according to the real brightness value (the image parameter) obtained by the processing circuit 110 in the first sensing operation of the foregoing embodiment of FIG. 3 to further obtain the reflectivity of the object surface of the sensing target 200. Accordingly, the processing circuit 110 may obtain the corrected distance parameter of the sensing target 200 by correcting the distance parameter according to the reflectivity. However, the second sensing operation of the invention is not limited to the signals and timing relationship of FIG. 4. In an embodiment, the second pixel circuit 132 may also be used in a distance measurement operation.

Figure 5:
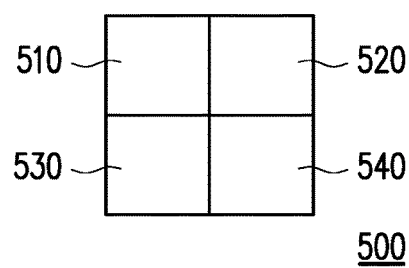
FIG. 5 is a schematic diagram of a pixel group according to an embodiment of the invention.

FIG. 5 is a schematic diagram of a pixel group according to an embodiment of the invention. Referring to FIG. 1 and FIG. 5, the pixel array of the sensing unit 130 may be composed of a plurality of pixel groups arranged in an array. Each of the pixel groups is similar to a pixel group 500 of FIG. 5, wherein the pixel group 500 includes pixels 510 to 540. Each of the pixels 510 to 540 may include the first pixel circuit 131 shown in FIG. 2, or each two pixels may form a differential structure of the first pixel circuit 131 and the second pixel circuit 132 shown in FIG. 2. Moreover, in an embodiment, each of the pixels 510 to 540 may be used to perform the first sensing operation described in the foregoing embodiment of FIG. 3 and the second sensing operation described in the foregoing embodiment of FIG. 4 at different times. In other words, the sensing unit 130 may perform the first sensing operation and the second sensing operation non-simultaneously by a plurality of photodiodes in the pixel array.

Moreover, in another embodiment, the pixels 510 and 520 may be used to perform the first sensing operation described in the foregoing embodiment of FIG. 3, and the pixels 530 and 540 may be used to the second sensing operation described in the foregoing embodiment of FIG. 4. In this regard, the light-emitting module 120 may simultaneously emit the first light pulse and the second light pulse to the sensing target 200, so that the pixels 510 to 540 can simultaneously perform the first sensing operation and the second sensing operation. In other words, the sensing unit 130 may perform the first sensing operation and the second sensing operation simultaneously by different photodiodes in the pixel array. Alternatively, since the first light pulse and the second light pulse may have the same pulse intensity, in yet another embodiment, the first light pulse and the second light pulse may also be the same light pulse.

Figure 6:
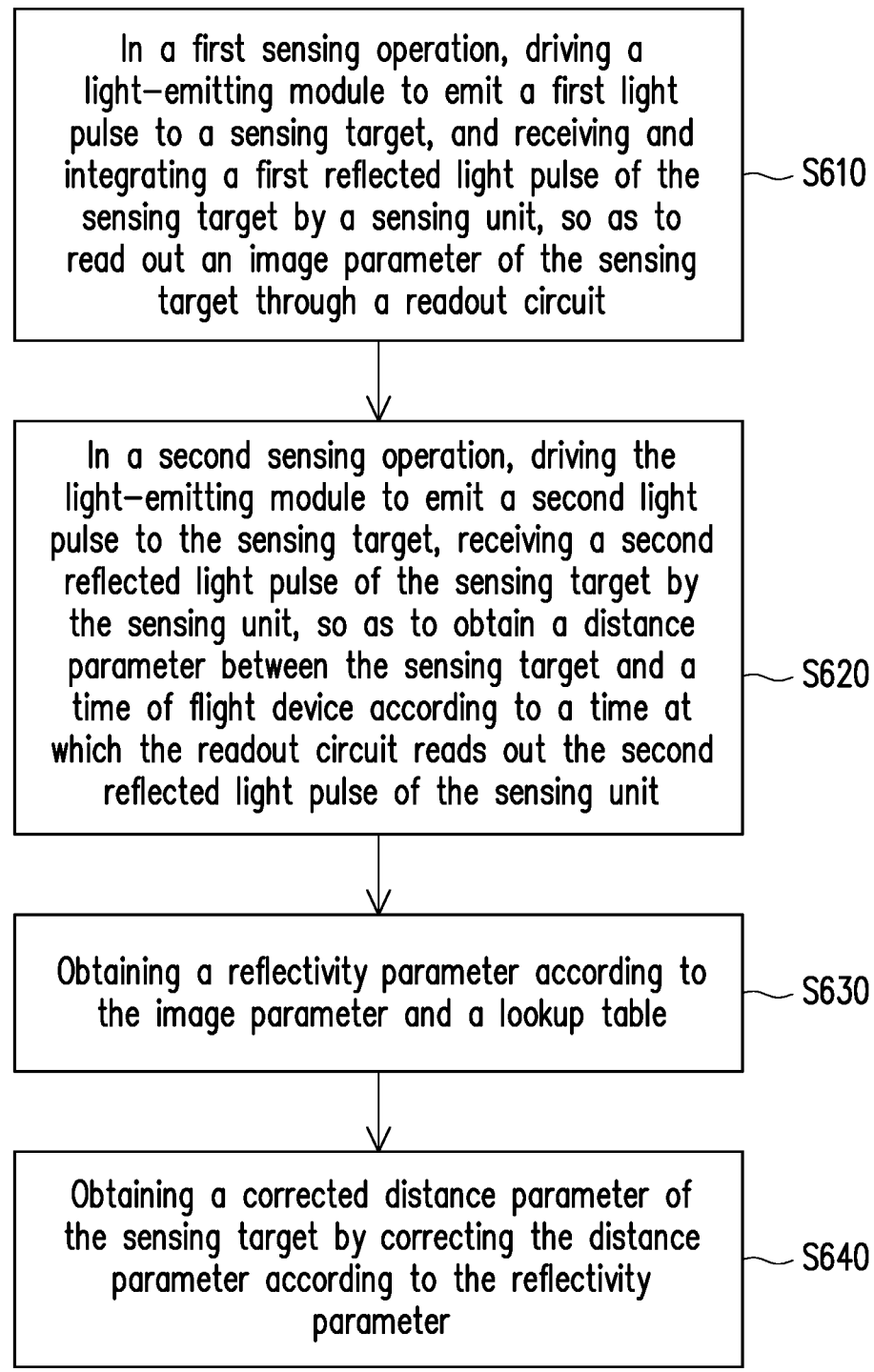
FIG. 6 is a flowchart of a time of flight method according to an embodiment of the invention.

FIG. 6 is a flowchart of a time of flight method according to an embodiment of the invention. Referring to FIG. 1 and FIG. 6, the time of flight method of the present embodiment is at least applicable to the time of flight device 100 in the embodiment of FIG. 1. In step S610, in a first sensing operation, the processing circuit 110 drives the light-emitting module 120 to emit a first light pulse to the sensing target 200, and receives and integrates a first reflected light pulse of the sensing target 200 by the sensing unit 130, so as to read an image parameter of the sensing target 200 through the readout circuit 140. In step S620, in a second sensing operation, the processing circuit 110 drives the light-emitting module 120 to emit a second light pulse to the sensing target 200, and receives a second reflected light pulse of the sensing target 200 by the sensing unit 130, so as to obtain a distance parameter between the sensing target 200 and the time of flight device 100 according to a time at which the readout circuit 140 reads the second reflected light pulse of the sensing unit 130. In step S630, the processing circuit 110 obtains a reflectivity of the sensing target 200 according to the image parameter and a look-up table stored in the memory 150. In step S640, the processing circuit 110 obtains a corrected distance parameter of the sensing target 200 by correcting the distance parameter according to the reflectivity. Accordingly, the time of flight method of the present embodiment may enable the time of flight device 100 to calculate and correct the impact of the comparator delay caused by the reflectivity of the object surface in the distance parameter according to the magnitude of the reflectivity, so that the time of flight device 100 can obtain an accurate distance parameter.

In addition, enough teaching, suggestion, and implementation regarding other device features and technical details of the time of flight device 100 of this embodiment may be obtained from the foregoing embodiments of FIG. 1 to FIG. 5, and thus related descriptions thereof are not repeated hereinafter.

In summary, the time of flight device and the time of flight method of the invention can obtain the image parameter for correction by performing the first sensing operation, and can obtain the distance parameter by performing the second sensing operation. In this way, the time of flight device and the time of flight method of the invention can be combined with the pre-established look-up table to obtain the corresponding reflectivity according to the image parameter, and correct the distance parameter according to the reflectivity. As a result, the impact of reflectivity difference of the object surface of the sensing target and the comparator delay may be effectively eliminated or reduced so that an accurate time of flight result can obtained.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A time of flight device, comprising:
a processing circuit;
a light source, coupled to the processing circuit;
a readout circuit, coupled to the processing circuit; and
a pixel array, coupled to the readout circuit,
wherein in a first sensing operation, the processing circuit drives the light source to emit a first light pulse to a sensing target, and the pixel array receives and integrates a first reflected light pulse of the sensing target to generate an image parameter of the sensing target, so that the processing circuit reads the image parameter of the sensing target through the readout circuit, wherein the image parameter corresponds to a reflectivity of the sensing target,
wherein in a second sensing operation, the processing circuit drives the light source to emit a second light pulse to the sensing target, and the pixel array receives a second reflected light pulse of the sensing target, so that the processing circuit obtains a distance parameter between the sensing target and the time of flight device according to a time at which the readout circuit reads the second reflected light pulse of the pixel array,
wherein the processing circuit obtains the reflectivity of the sensing target by checking a look-up table according to the image parameter, and obtains a corrected distance parameter of the sensing target by correcting the distance parameter according to the reflectivity.

2. The time of flight device of claim 1, wherein the first light pulse and the second light pulse have the same pulse intensity.

3. The time of flight device of claim 1, wherein the processing circuit calculates a time difference between the second light pulse emitted by the light source and the second reflected light pulse of the pixel array read by the readout circuit, so as to obtain the distance parameter between the sensing target and the time of flight device.

4. The time of flight device of claim 1, wherein the readout circuit comprises:
a comparator, comprising a first input terminal and an output terminal, wherein the output terminal of the comparator is coupled to the processing circuit; and
a ramp generator, coupled to the first input terminal of the comparator, and configured to provide a first ramp signal to the first input terminal of the comparator in the first sensing operation.

5. The time of flight device of claim 4, wherein the comparator further comprises a second input terminal, and the second input terminal of the comparator is coupled to a reference voltage.

6. The time of flight device of claim 5, wherein the pixel array comprises a first pixel circuit and a second pixel circuit, the first pixel circuit is coupled to the first input terminal of the comparator, the second pixel circuit is coupled to the second input terminal of the comparator, and the reference voltage is from the second pixel circuit.

7. The time of flight device of claim 5, wherein the ramp generator is coupled to the second input terminal of the comparator, and configured to provide a second ramp signal to the second input terminal of the comparator in the first sensing operation wherein the first ramp signal and the second ramp signal are inverted.

8. The time of flight device of claim 1, wherein the pixel array performs the first sensing operation and the second sensing operation non-simultaneously by a plurality of photodiodes in the pixel array.

9. The time of flight device of claim 1, wherein the pixel array performs the first sensing operation and the second sensing operation simultaneously by different photodiodes in the pixel array.

10. The time of flight device of claim 9, wherein the first light pulse and the second light pulse are the same light pulse.

11. The time of flight device of claim 9, wherein the pixel array comprises a plurality of pixel groups, and each of the pixel groups comprises two first pixel circuits and two second pixel circuits.

12. A time of flight method, comprising:
  in a first sensing operation, driving a light source to emit a first light pulse to a sensing target, and receiving and integrating a first reflected light pulse of the sensing target by a pixel array to generate an image parameter of the sensing target, so as to read the image parameter of the sensing target through a readout circuit, wherein the image parameter corresponds to a reflectivity of the sensing target;
  in a second sensing operation, driving the light source to emit a second light pulse to the sensing target, receiving a second reflected light pulse of the sensing target by the pixel array, so as to obtain a distance parameter between the sensing target and a time of flight device according to a time at which the readout circuit reads the second reflected light pulse of the pixel array;
  obtaining a reflectivity parameter according to the image parameter and a look-up table; and
  obtaining a corrected distance parameter of the sensing target by correcting the distance parameter according to the reflectivity parameter.

13. The time of flight method of claim 12, wherein the first light pulse and the second light pulse have the same pulse intensity.

14. The time of flight method of claim 12, wherein the step of obtaining the distance parameter between the sensing target and the time of flight device comprises:
  calculating a time difference between the second light pulse emitted by the light source and the second reflected light pulse of the pixel array read by the readout circuit, so as to obtain the distance parameter between the sensing target and the time of flight device.

15. The time of flight method of claim 12, wherein the pixel array comprises a first pixel circuit and a second pixel circuit, wherein the first pixel circuit is configured to receive and integrate the first reflected light pulse of the sensing target in the first sensing operation, and the second pixel circuit is configured to receive and integrate the second reflected light pulse of the sensing target in the second sensing operation.

16. The time of flight method of claim 12, wherein the first sensing operation and the second sensing operation are performed non-simultaneously by a plurality of photodiodes in the pixel array.

17. The time of flight method of claim 12, wherein the first sensing operation and the second sensing operation are performed simultaneously by different photodiodes in the pixel array.

18. The time of flight method of claim 17, wherein the first light pulse and the second light pulse are the same light pulse.

* * * * *